US006583798B1

(12) United States Patent
Hoek et al.

(10) Patent No.: US 6,583,798 B1
(45) Date of Patent: Jun. 24, 2003

(54) ON-OBJECT USER INTERFACE

(75) Inventors: Tjeerd Hoek, Kirkland, WA (US); Glenn Frankel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 402 days.

(21) Appl. No.: 09/620,876

(22) Filed: Jul. 21, 2000

(51) Int. Cl.[7] ................................................. G09G 5/00
(52) U.S. Cl. ...................... 345/822; 345/823; 345/808; 707/540; 707/533
(58) Field of Search ................................ 707/540, 532, 707/533; 345/822, 823, 821, 808, 812

(56) References Cited

U.S. PATENT DOCUMENTS

| 5,596,694 A | * | 1/1997 | Capps ........................ 345/473 |
| 5,778,402 A | * | 7/1998 | Gipson ....................... 707/530 |
| 5,940,847 A | * | 8/1999 | Fein et al. .................. 707/540 |
| 6,012,075 A | * | 1/2000 | Fein et al. .................. 707/540 |
| 6,085,206 A | * | 7/2000 | Domini et al. .............. 707/533 |

* cited by examiner

Primary Examiner—John W. Cabeca
Assistant Examiner—Shawn Becker
(74) Attorney, Agent, or Firm—Merchant & Gould

(57) ABSTRACT

An on-object user interface (OOUI) for presenting information and controls to a user in response to an automatic action performed by an application program. The OOUI is associated with object that was subject to the automatic action. The OOUI comprises a first graphical indicator, a second graphical indicator and a context menu. The first graphical indicator is displayed in proximity to the object, in order to indicate that the automatic action was performed. The automatic action may comprise an auto-correct or an auto-format action. The automatic action may also comprise the setting of a property relating to formatting or positioning of the object in response to a user-initiated action. When user interaction with the first graphical indicator is detected, the first graphical indicator is changed to the second graphical indicator, which indicates that a context menu is available. Then, in response to user interaction with the second graphical indicator, the context menu is displayed on the display device in proximity to the object. The context menu may include one or more interactive controls for allowing the user to undo or modify the automatic action. The context menu may also include an interactive control for allowing the user to customize future applications of the auto correct action.

27 Claims, 6 Drawing Sheets

Contrary to teh|

*FIG. 1A*

Contrary to the beliefs of the majority of the|

*FIG. 1B*

Contrary to the beliefs of the majority of the|

AutoCorrect Options

*FIG. 1C*

Contrary to the beliefs of the majori...

↶ Undo AutoCorrect
☐ Never AutoCorrect "teh"
AutoFormat Options . . .

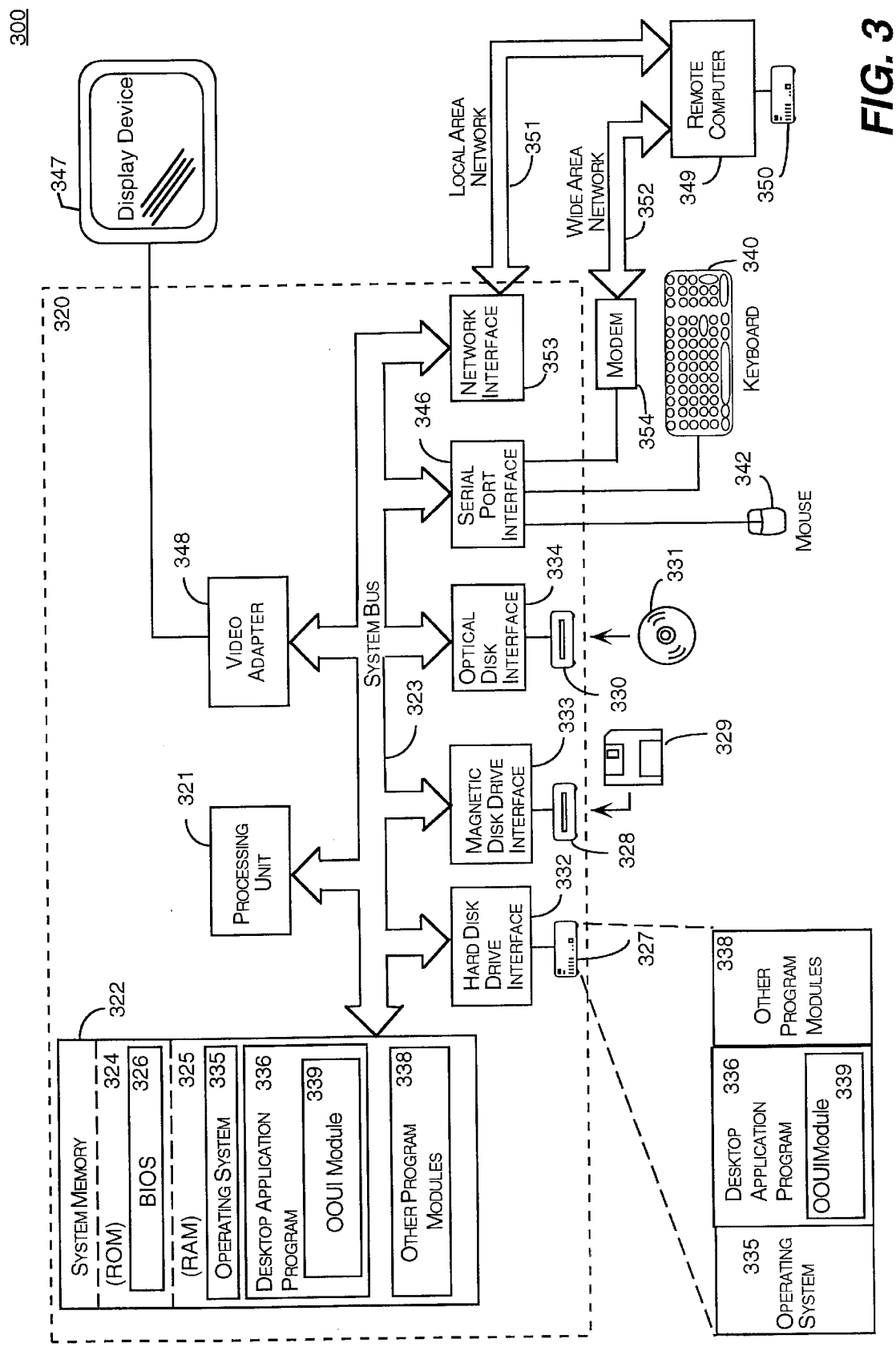

ON-OBJECT USER INTERFACE

TECHNICAL FIELD

The present invention relates to interactive controls within application program modules. More particularly, the present invention relates to interactive controls that are displayed in proximity to an object for the purpose of reviewing and/or modifying an automatic action performed on or in connection with the object.

BACKGROUND OF THE INVENTION

Application program modules are provided with an increasing level of intelligence. Such intelligence often comprises functionality for predicting a user's intended or desired actions to automatically correct perceived errors or to automatically apply formatting. While intelligent and automatic actions are generally helpful and timesaving for users, the result of an automatic action may not always be in accordance with the desires of a particular user. Traditional toolbar and menu mechanisms for undoing or disabling an automatic action require that a user spend additional time and effort to discover, access and understand the appropriate controls. Thus, the typical user tends to feel frustrated or inconvenienced when the need arises to undo or otherwise change an undesired automatic action.

In addition, some user-initiated actions result in the application of default formatting, positioning, and other settings or properties. Such user-initiated actions include, but are not limited to, paste operations and insert operations. As is the case with the automatic actions described above, users are required to navigate through traditional toolbar and menu options to try to undo or modify any default settings or properties that may be applied to their data. Again, this process of undoing or modifying default settings and properties can prove to be time consuming and potentially frustrating for the typical user.

One prior mechanism intended to make the process of undoing or modifying an automatic or user-initiated action easier is referred to as a "right-click" menu. A right-click menu is a menu of contextual commands that are associated with an object. A right-click menu is displayed when the user positions the cursor in proximity to the object and clicks on the right button of a mouse or other pointing device. The right-click menu itself is displayed in proximity to the object, so that the user does not have to move the cursor or his attention to another location on the display device. A right-click menu generally includes one or more useful commands that can speed-up the user's work and reduce the number of clicks and the mouse travel required to perform an action.

However, usability tests have revealed that the typical user is not aware of the existence of right-click menus. In addition, those users that are aware of right-click menus often do not remember to use them and thus tend to revert to traditional toolbar and menu mechanisms. The difficulty in discovering a right-click menu is amplified in situations where an automatic action, such as a spelling correction, can occur quickly and unnoticeably to the user. In other words, if the user does not recognize that an automatic action has occurred, the user will certainly not appreciate that a right-click menu could be available to undo the automatic action. Furthermore, in some situations, the location of the handle that provides access to a hidden right-click menu may not be apparent to the user. For example, when a pasted object comprises a page of text that includes interspersed white-space, tables and pictures, the user has no way of knowing on what portion of the pasted object she should right-click to expose the context menu.

In addition, right-click menus are traditionally static, in that they do not relate specifically to the context of a particular automatic action. In other words, one predefined right-click menu generally applies to all automatic actions. Accordingly, there remains a need for a graphical user interface that provides highly contextual commands to the user in close proximity to an object that is subject to an automatic or user-initiated action. There is also a need for such a graphical user interface having a clear entry point to the contextual commands.

SUMMARY OF THE INVENTION

The present invention satisfies the above described needs by providing a system and method for presenting information and controls to a user in response to an automatic action performed by an application program. The information and controls a displayed on the display device in proximity to the object that was subject to the automatic action by the application program. The information and controls are embodied in an on-object user interface (OOUI) that is associated with the object. The OOUI comprises a first graphical indicator, a second graphical indicator and a context menu. The first graphical indicator is displayed on the display device in proximity to the object, in order to indicate that the automatic action was performed. In the case where the automatic action comprises an auto-correct or an auto-format action, the first graphical indicator may comprise a small rectangle that is displayed underneath the object. In one embodiment, the first graphical indicator is not displayed until user interaction with the object is detected. The automatic action may also comprise the setting of a property of the object in response to a user-initiated action. The user-initiated action may comprise a paste operation or an insert operation and the property of the object may relate to formatting or positioning of the object.

After the first graphical indicator is displayed, a determination is made as to whether the user interacts with the first graphical indicator. In response to detecting user interaction with the first graphical indicator, the first graphical indicator is changed to the second graphical indicator, which indicates that a context menu is available. By way of example only, the second graphical indicator may comprise a selectable button. Then in response to user interaction with the second graphical indicator, the context menu is displayed on the display device in proximity to the object. The context menu may comprise, for example, a drop-down menu that is activated in response to selection of the selectable button. The context menu may include one or more interactive controls for allowing the user to undo or modify the automatic action. The context menu may also include an interactive control for allowing the user to customize future applications of the auto correct action. The exemplary methods for creating, displaying and managing an OOUI may be embodied in an OOUI program module stored on a computer-readable medium for execution by a computer system. Furthermore, an OOUI may be embodied in a data structure stored on a computer-readable medium.

BRIEF DESCRIPTION OF THE DRAWINGS

FIG. 1, comprising FIGS. 1A–1D, illustrates an exemplary embodiment of the present invention used in connection with an auto-correct action.

Figure 2A:
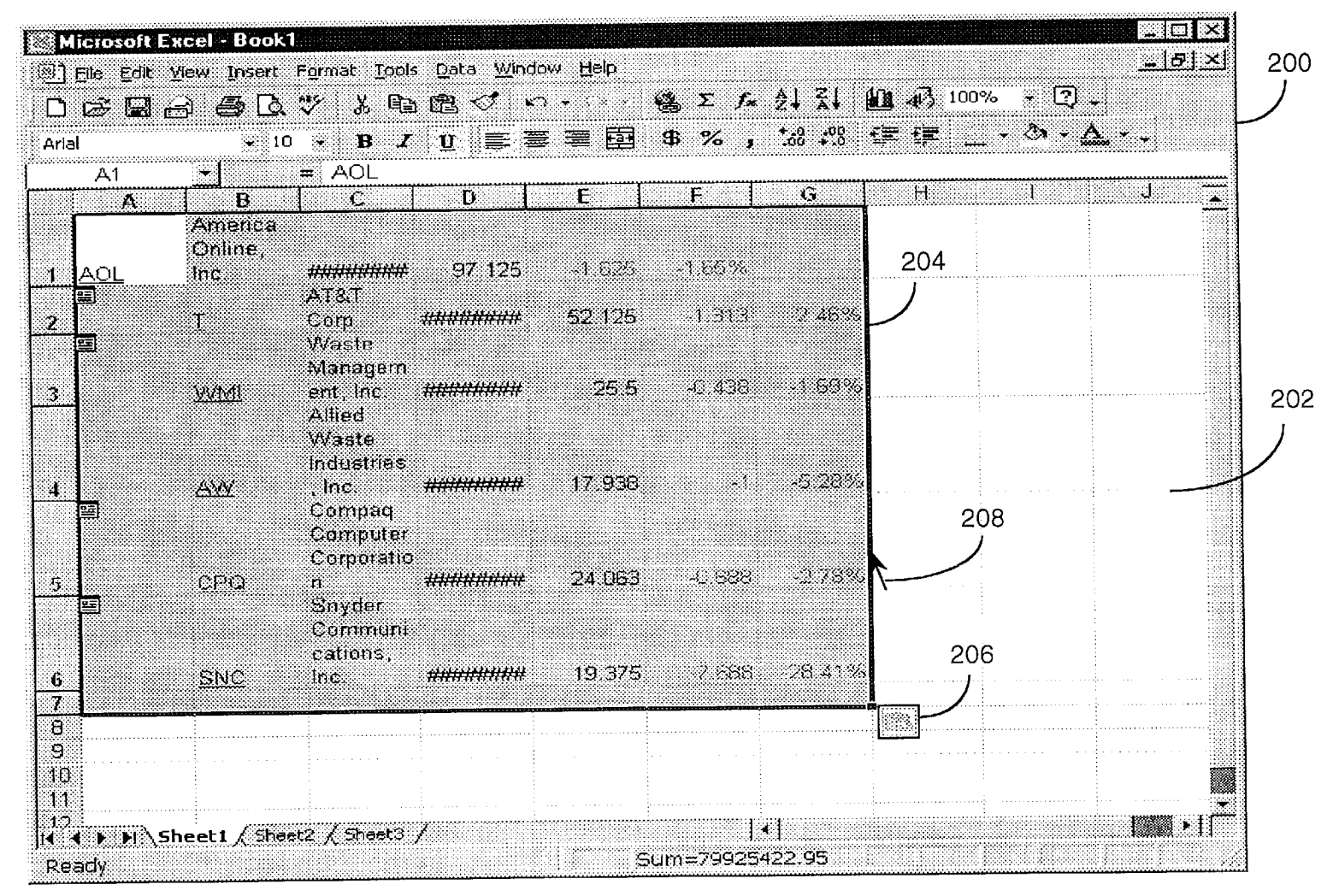

FIG. 2, comprising FIGS. 2A and 2B illustrates an exemplary embodiment of the present invention used in connection with a paste operation.

FIG. 3 is a functional block diagram of a computer system forming an exemplary operating environment for the exemplary embodiments of the invention.

DETAILED DESCRIPTION OF THE EXEMPLARY EMBODIMENTS

Figure 2B:
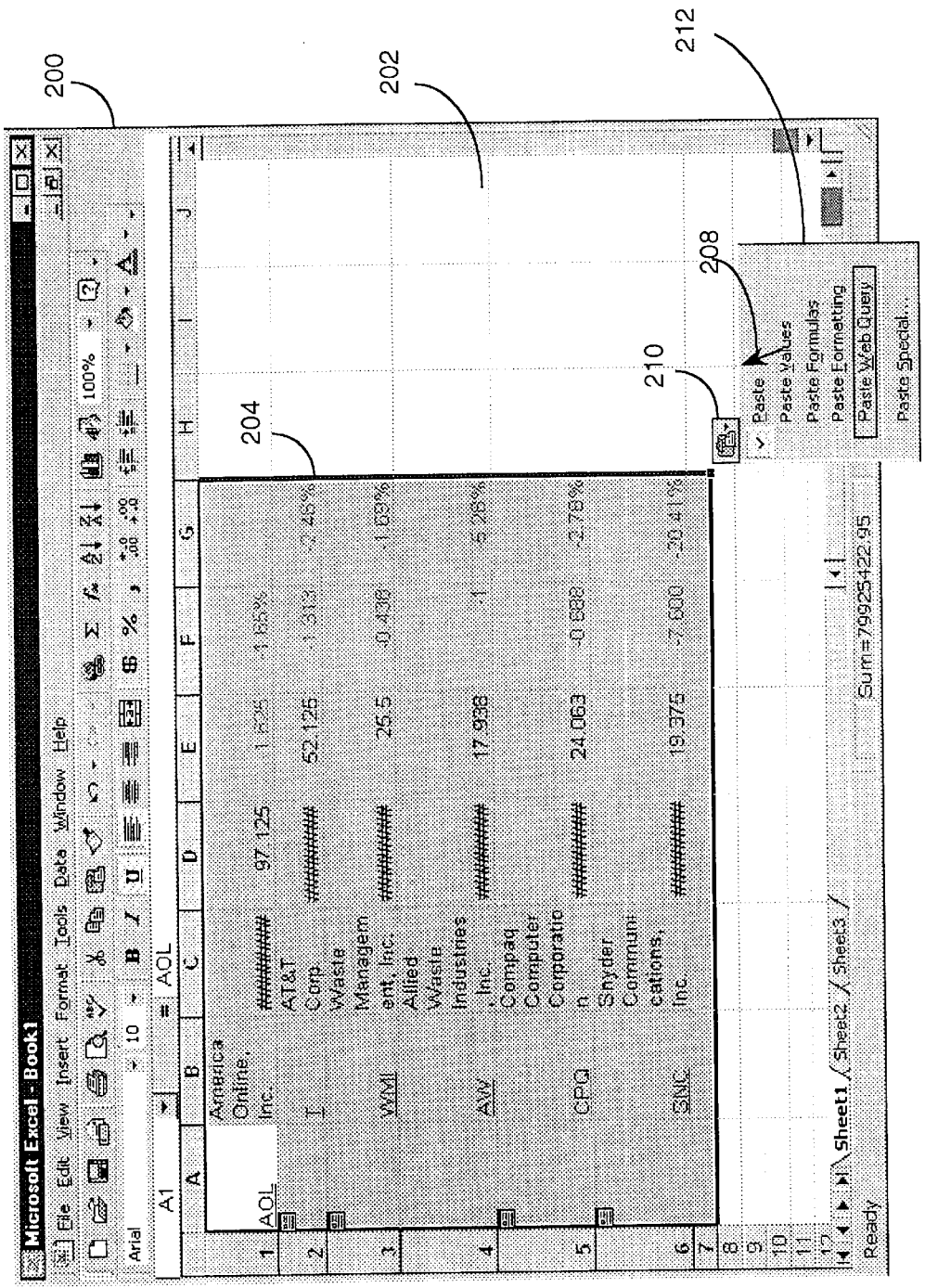

The present invention provides a new and creative interface for alerting the user of an application program module that a highly contextual menu of controls is available for a particular object. The interface provided by the present invention is referred to herein as an "on-object user interface" (OOUI). In general an OOUI comprises a menu of contextual controls (context menu) and one or more graphical indicators displayed in proximity to an object for indicating that the context menu is available for that object. As used herein, the term "object" is meant to refer to any item displayed by an application program module for manipulation by the user. For example, within a word processor, electronic spreadsheet or desktop publication program module, an object may comprise a string of text, a table or plurality of cells, a graphic, an image, a video clip, etc.

The OOUI provides an easily discoverable set of controls that enable the user to quickly undo or modify an action that the user or the application program module may have taken. For example, the OOUI may be used in connection with automatic actions such as auto-correct and auto-format. The OOUI may also be used in connection with user initiated actions, such as paste operations and insertion operations. Thus, even when the application program module would normally apply only default settings and/or properties to an object that the user works with, an OOUI may be made available so that the user can customize the settings and/or properties for the object.

The graphical indicator(s) of the OOUI are meant to serve as a delivery mechanism for visually suggesting the availability of a context menu. Depending on the situation in which an OOUI is utilized, a primary design goal may be to provide only a subtle an unobtrusive hint to the user that more information and contextual controls may be available for a particular object. Therefore, in an exemplary embodiment a first graphical indicator, referred to herein as a "lightweight" graphical indicator, may first be displayed in connection with an object. Other than by way of its very presence, the lightweight graphical indicator may not provide any information regarding the corresponding object or the OOUI. However, when the user interacts with the lightweight graphical indicator, the lightweight graphical indicator may be changed to a second graphical indicator, referred to herein as a "heavyweight" graphical indicator, that provides graphical and/or textual information about the object. Then, if the user further interacts with the "heavyweight" graphical indicator, an underlying context menu may be displayed. Of course, an OOUI may employ only a single graphical indicator that portrays any amount of information regarding the object and the underlying context menu. Other variations, such as providing an OOUI that changes between more than two types of graphical indicators, will occur to those of ordinary skill in the art.

Various exemplary embodiments of the present invention will now be described in greater detail with reference to the drawings, in which like numeral indicate like elements throughout the several figures. FIG. 1, comprising FIGS. 1A–1D, illustrates the utilization of the inventive OOUI in connection with an auto-correct action. As a user interacts with a word processor or other application program module in order to type in a string of text 102, the application program module may perform various automatic actions. Typical automatic actions include, for example, auto-correction of typographical, spelling and grammar errors and auto-formatting. Automatic actions may be performed by background processes executed by the application program module. For example, an application program module may execute a background process for detecting and/or correcting common typographical errors.

As shown in FIG. 1A, a string of text 102 may include the common typographical error "teh," which should properly be typed as "teh." The application program may execute an auto-correct background process that monitors user input text strings for the inclusion of the misspelled word "teh" and other misspelled words. Whenever the misspelled word "teh" is detected, the auto-correct process may replace the misspelled word with the properly spelled word, as shown in FIG. 1B. It may be seen in FIG. 1B that as soon as user depresses the space bar, or otherwise moves the text cursor 104 away from the letters "teh," the auto-correct process determines that the letters "teh" form a discrete word that is most likely intended to be the word "teh" 105. In this example, the word "teh" 105 is treated as an auto-corrected object. As mentioned, however, automatic actions, such as the auto-correct action demonstrated in FIG. 1, are based on a best guess of a typical user's intentions or desires. Therefore, for any particular user, the results of an automatic action may in fact be undesirable. Also, since automatic actions may be performed silently in a background process, the user may be unaware that undesirable changes are made to the input data.

In order to alert the user of automatic actions in an unobtrusive manner, a graphical indicator of an OOUI may be positioned on the display screen in proximity to the location where the automatic action occurred. In accordance with the present invention, any form of a graphical indicator may be used in conjunction with an OOUI, including an icon, a selectable control or button, a colored or patterned text string, etc. However, as mentioned, it may be a design goal of the OOUI to be unobtrusive to the user's normal interaction with the application program module. Thus, as shown in FIG. 1B, a first graphical indicator may comprise a small rectangle 106 or other small geometric shape displayed beneath the object to which the OOUI corresponds (auto-corrected object 105). In an exemplary embodiment, the rectangle 106 is distinctly colored, so as to be visually distinguishable from other indicators that may be displayed to the user by a word processor or other application program and also to distinguish it from any formatting or objects that are actually part of the document content. In addition, the rectangle 106 may be displayed as only an outline shape and not filled with a color pattern.

In situations where it is highly likely that the user will desire the result of an auto-correct action, the rectangle 106 might not be displayed until the user interacts with the auto-corrected object 105. User interaction with the auto-corrected object 105 may comprise moving the text cursor 104 within the auto-corrected object 105 or positioning the pointing cursor 108 over (or near) the auto-corrected object 105. The example of FIG. 1, where the word "teh" auto-corrected to the word "teh," may be a situation where it is highly likely that the user will agree with the auto-correction. However, in cases where it is less likely an auto-correct action will be desired by the user, it may be desirable to display the rectangle immediately, regardless of whether the user interacts with the rectangle 106. By way of example, auto-formatting of a lists may be a situation in which it is less likely that the user will agree with the automatic action.

The presence of the rectangle 106 is meant to indicate that some automatic action has been performed, but provides no other information to the user. The rectangle 106 may be interactive, in that it may be changed to display additional information regarding the automatic action and the OOUI in response to an implicit or explicit user command. For example, FIG. 1C illustrates that when the pointing cursor 108 is positioned on or in proximity to the rectangle 106, the rectangle 106 may be changed to a button 110 or other type of icon indicating that a context menu is available. The button 110 in FIG. 1C includes an image resembling a down-arrow, which is meant to indicate that activation of the button 110 will cause a pull-down menu to appear. Accordingly, information regarding the automatic action and the OOUI is provided to the user only if the user so desires. The choice to first display a simple rectangle 106 and subsequently transition to a more detailed button 110 may be driven by the fact that a user-friendly button 110 may be large enough that it overlaps surrounding text or other portions of the document and thus interferes with the user's work.

In addition to changing the rectangle 106 to the button 110, user interaction with the rectangle 106 may also cause an information tag 112 to be displayed. In the example of FIG. 1C, the information tag 112 indicates that the button corresponds to an AutoCorrect Controller OOUI. The information tag 112 may optionally be included in order to provide additional information to the user regarding the nature and purpose of the button 110. Thus, by way of the button 110 and the information tag 112, the user should quickly and efficiently be provided with enough information to determine the nature of the automatic action that has been performed and the purpose of the button 110 that has been displayed. Should the user decide that the automatic action was desired, the user may cease interaction with the button 110 without the need for further processing of instructions for displaying the context menu.

However, should the user decide that the automatic action was not desired, the user may use the pointing cursor 108 to activate or depress the button 110. Activation of the button 110 causes a context menu 114 to be displayed. The context menu may include various selectable commands for undoing the automatic action, instructing the program module never to perform the particular automatic action again, and/or for customizing the automatic action process in some manner. These and other contextual commands may be presented to the user via the context menu 114.

When the user does not select the button 110, the button 110 should be dismissed from the display. In certain situations, it may be desirable to transition the button 110 back to the rectangle 106, which may be persisted on the display so that the user may be reminded of the OOUI when later proofreading the document. In other situations, however, it may be more desirable to dismiss both the button 110 and the rectangle 106, so as to free the display form clutter. Dismissing the button 110 and the rectangle 106 after the user interaction may be based on the assumption that the user has either used the OOUI to undo or modify the automatic action, or that the user has discovered the OOUI and has affirmed the automatic action through non-use of the OOUI. Still, even when no graphical indicators are displayed, the OOUI may be persisted in association with the auto-corrected object 105, so that the user may later interact with the OOUI (such as by positioning the pointing cursor over the auto-corrected object 105 to trigger display of the rectangle 106 and/or button 110). Of course, when the auto-corrected object 105 is deleted, the OOUI may be discarded.

Optionally, the rectangle 106 may be animated, at least for a short duration in order to more readily capture the user's attention. User interaction with the rectangle 106 may cause the animation to cease, since it may be assumed that the user has discovered the OOUI. In addition, user interaction with a first rectangle 106 displayed in connection with a first OOUI may cause the animation of the first rectangle 106 and that of any other rectangle displayed in connection with other OOUI to cease. Other optional customizations may include terminating the animation after some number of iterations in order to avoid frustrating a user who opts out of interacting with it. The animation may also be stopped upon user interaction with the animated graphical indicator or upon the occurrence of some number of iterations (for example, 3) of the animation sequence, whichever comes first. Animation may take any form well known in the art, such as movement, blinking, color change, shape change, and the like. Of course, the button 110 may also be animated if so desired by the developer.

Those skilled in the art will recognize that the auto-correct operation described with reference to FIG. 1 is but one example of many automatic actions that may be performed by an application program module. While in most cases the user will desire the word "teh" to be changed to the word "teh," it should be clearly appreciated that in some instances the user may not desire such a correction. For instance, the user may intend to type the sentence "Please review the TEH contract" and an auto-correct operation would undesirably change the sentence to read "Please review the THE contract." As another example, a user may intend to type the phrase "See section (c), above" and the auto-correct operation would undesirably change the phrase to read "Please see section ©, above." Accordingly, the OOUI of the present invention may be displayed in association with any object that is subject to an automatic action, thereby assisting the user in noticing the automatic action and providing controls for undoing or modifying the automatic action.

FIG. 2, comprising FIG. 2A and FIG. 2B, illustrates another embodiment of an OOUI in accordance with the present invention. FIG. 2A shows a display screen 200 of an electronic spreadsheet program module. A pasted object 204, comprising a number of rows and columns of cells, has been "pasted" into a worksheet 202. "Cut and paste" or "copy and paste" operations are well known in the art. Essentially, the pasted object 204 was previously copied from a source application to a temporary location referred to as a clipboard. When stored on the clipboard, the copied object may retain the formatting that was applied thereto by the source application. When the paste operation is subsequently performed, the target application may be equipped with functionality to make some decisions regarding formatting. The pasted object 204 may, for example, be formatted according to the default formatting of the target application or according to the retained formatting of the source application. Furthermore, the pasted object 204 may be specially formatted consistent with the formatting of data that already exists in the target application. Regardless of how accurate automatic formatting decisions can be, there will always be cases in which the user will desire a different formatting result.

The OOUI of the present invention may be associated with pasted object 204 in order to allow the user to undo or modify any automatic or default formatting actions that are performed by the target application program. Again, the OOUI may comprise a first graphical indicator, such as a "lightweight" graphical indicator 206, that may be displayed in order to alert the user that a context menu is associated with the pasted object 204 and may be displayed if the user so desires. In an exemplary embodiment, the lightweight graphical indicator 206 may be temporarily displayed until the user interacts with it and then ceases to interact with it. Also, even if the user does not interact with the lightweight graphical indicator 206 at all, it may be dismissed when the user subsequently interacts with the application program in such a way that a new "undoable" action is performed. An undoable action is one that alters the data of the application program and causes an "undo stack" in memory to be changed. Also, the lightweight graphical indicator 206 should be dismissed when the contents of the clipboard are altered. Those skilled in the art will appreciate that a clipboard may be shared by more than one application program module. Alteration of the contents of the clipboard by any application program module should cause the lightweight graphical indicator 206 to be dismissed.

If the user interacts with the first graphical indicator 206, such as by placing the pointing cursor 208 on or in proximity thereto, the lightweight graphical indicator 206 may be changed into a second graphical indicator, such as a button 210 shown in FIG. 2B. The button 210 may include an image resembling a down-arrow, which is meant to indicate that a pull-down context menu 212 is available. Again, the context menu 212 may include any number of relevant commands that allow the user to undo the paste operation, apply special formatting to the pasted object 204, etc. By way of illustration, a context menu associated with a pasted object comprising cell from a table may provide options for retaining the formatting of the source file, matching the formatting of the target file, retaining source column widths, formatting values and numbers, linking cells, and the like.

As mentioned, it may not be desirable or practical to persist an OOUI that corresponds to a paste operation for a significant length of time. However, the user may not be pleased with an initial change made to the pasted object 204 by selection of a command in the context menu 212. Thus, the user may desire to select subsequent commands from the context menu 212 until satisfied with the pasted object. Accordingly, in an exemplary embodiment, the button 210 may be persisted until the user interacts with the application program module in such a way as to perform a subsequent undoable action, or to change the contents of the clipboard. Those skilled in the art will recognize that decisions regarding the situations in which to persist an OOUI, and for how long, are based on various design considerations that may be different in different contexts. Again, the graphical indicators of the OOUI may be animated if desired.

Functionality underlying the OOUI of the present invention may be provided by way of a program module, referred to herein as an OOUI module. Program modules include routines, sub-routines, programs, objects, components, data structures, etc., which perform particular tasks or implement particular abstract data types when executed by a computer system. FIG. 3 is a block diagram of a computer system that may serve as an exemplary operating environment for implementation of the OOUI module of the present invention. The exemplary operating environment includes a general-purpose computing device in the form of a conventional personal computer 320. Generally, a personal computer 320 includes a processing unit 321, a system memory 322, and a system bus 323 that couples various system components including the system memory 322 to processing unit 321. System bus 323 may be any of several types of bus structures including a memory bus or memory controller, a peripheral bus, and a local bus using any of a variety of bus architectures. The system memory includes a read only memory (ROM) 324 and random access memory (RAM) 325. A basic input/output system (BIOS) 326, containing the basic routines that helps to transfer information between elements within personal computer 320, such as during start-up, is stored in ROM 324.

Personal computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD-ROM or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. Although the exemplary environment described herein employs hard disk 327, removable magnetic disk 329, and removable optical disk 331, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 320. For example, one or more data files 360 may be stored in the RAM 325 and/or hard drive 327 of the personal computer 320.

A number of program modules may be stored on hard disk 327, magnetic disk 329, optical disk 331, ROM 324, or RAM 325, including an operating system 335, one or more desktop application program modules 336, an OOUI module 339, and other program modules 338. The OOUI module 339 of the present invention may be incorporated into or otherwise in communication with a desktop application program module 336. Generally, an OOUI module 339 includes computer-executable instructions for creating displaying and managing one or more OOUI.

A user may enter commands and information into personal computer 320 through input devices, such as a keyboard 340 and a pointing device 342. Other input devices (not shown) may include a microphone, joystick, game pad, satellite dish, scanner, or the like. These and other input devices are often connected to processing unit 322 through a serial port interface 346 that is coupled to the system bus 323, but may be connected by other interfaces, such as a parallel port, game port, a universal serial bus (USB), or the like. A display device 347 may also be connected to system bus 323 via an interface, such as a video adapter 348. In addition to the monitor, personal computers typically include other peripheral output devices (not shown), such as speakers and printers.

Personal computer 320 may operate in a networked environment using logical connections to one or more remote computers 349. Remote computer 349 may be another personal computer, a server, a client, a router, a network PC, a peer device, or other common network node. While a remote computer 349 typically includes many or all of the elements described above relative to personal computer 320, only a memory storage device 350 has been illustrated in the figure. The logical connections depicted in the figure include a local area network (LAN) 351 and a wide area network (WAN) 352. Such networking environments are commonplace in offices, enterprise-wide computer networks, intranets, and the Internet.

When used in a LAN networking environment, personal computer 320 is connected to local area network 351 through a network interface or adapter 353. When used in a WAN networking environment, personal computer 320 typically includes a modem 354 or other means for establishing communications over WAN 352, such as the Internet. Modem 354, which may be internal or external, is connected to system bus 323 via serial port interface 346. In a networked environment, program modules depicted relative to personal computer 320, or portions thereof, may be stored in the remote memory storage device 350. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 4:
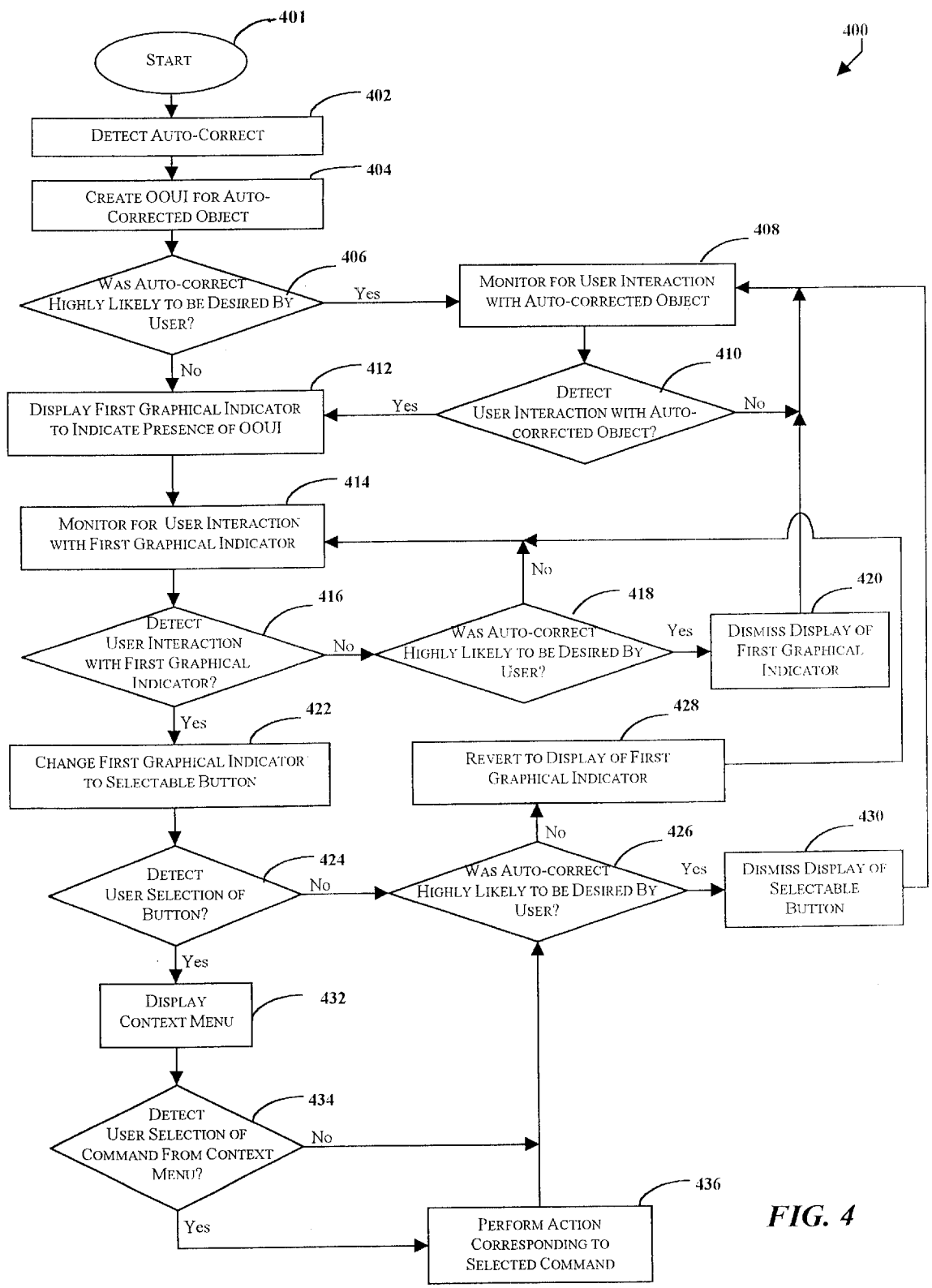
FIG. 4 is a flow chart that illustrates the general operation of an exemplary embodiment of the present invention in connection with an auto-correct action.

FIG. 4 is a flow chart illustrating an exemplary method for creating, displaying and managing an OOUI. The exemplary method of FIG. 4 will be described with reference to an OOUI created in response to an automatic action, such as an auto-correct or an auto-format. The exemplary method 400 begins at starting block 401 where an application program module is being executed by a computer. From starting block 401, the method proceeds to step 402, where an auto-correct action is detected. Next, the method moves to step 404, where an OOUI is created and associated with the object on which the auto-correct action was performed. In order to create the OOUI, the code that executes the auto-correct action may make a call to an OOUI module. The OOUI module may be responsible for determining the location on the display device at which the auto-corrected object is displayed. Based on the location of the auto-corrected object, the OOUI module will determine the location for display of the graphical indicators of the OOUI. In an exemplary embodiment, the OOUI will be displayed in close proximity to the auto-corrected object. The OOUI module may also determine a set of controls that are relevant to the auto-correct action. For example, the OOUI function may determine that "undo," "don't do again," or other types of controls are relevant to the auto-correct action. Of course, the commands that are relevant to a particular type of automatic action may be predetermined by the developer.

After creation of the OOUI, the method advances to step 406 where a determination is made as to whether the auto-correct action is highly likely to be desired by the user. As mentioned with reference to FIG. 1, if the auto-correct action is highly likely to be desired by the user, no graphical indicators of the OOUI will be displayed until the user interacts with the auto-corrected object. In this manner, the user's display screen is not cluttered by unnecessary and potentially distracting graphics. Thus, if it is determined at step 406 that the auto-correct action is not highly likely to be desired by the user, the method advances to step 412, where a first graphical indicator for the OOUI is displayed in order to indicate the presence of the OOUI. Otherwise, if it is determined that the auto-correct action is not highly likely to be desired, method proceeds to step 408 to monitor for user interaction with the auto-corrected object. From step 408 the method moves to step 410, where it is determined whether user interaction with the auto-corrected object is detected. Again, user interaction with the auto-corrected object may comprise moving the text cursor within the auto-corrected object or positioning the pointing cursor over (or near) the auto-corrected object. If no user interaction with the auto-corrected object is detected, the method returns to step 408 to continue monitoring for user interaction. When user interaction with the auto-corrected object is detected at step 410, the first graphical indicator for the OOUI is displayed at step 412. As previously described, the first graphical indicator may be a simple, small and unobtrusive graphic displayed closely to the auto-corrected object.

After the first graphical indicator is displayed, the method monitors for user interaction with the first graphical indicator at step 414. If no user interaction with the first graphical indicator is detected at step 416, it is again determined at step 418 whether the auto-correct action was highly likely to be desirable to the user. If the auto-correct action was highly likely to be desirable to the user, the method proceeds from step 418 to step 420, where the first graphical indicator is dismissed from the display. Dismissing the first graphical indicator does not purge the OOUI from memory. The OOUI may be retained in memory and associated with the auto-corrected object as long as the auto-corrected object exists. Therefore, after the first graphical indicator is dismissed from the display, the method returns to step 408 to monitor for user interaction with the auto-corrected object. When user interaction with the auto-corrected object is again detected at step 410, the method is repeated as described above.

Returning to step 418, if no user interaction with the first graphical indicator was detected and the auto-correct action was not highly likely to be desirable to the user, the first graphical indicator is not dismissed and the method returns to step 414 to continue monitoring for user interaction with the first graphical indicator. When user interaction with the first graphical indicator is detected at step 416, the first graphical indicator may be changed to a second graphical indicator, such as a selectable button, at step 422. The transition from the first graphical indicator to the second graphical indicator may involve animation, if desired, or may simply appear instantaneous to the user. In an exemplary embodiment, the second graphical indicator presents some additional information about the nature of the auto-correct action and the associated OOUI.

Next, at step 424 it is determined whether a user selection of the button (second graphical indicator) is detected. If so, a determination is again made at step 426 as to whether the auto-correct action was highly likely to be desired by the user. If the auto-correct action was highly likely to be desired by the user, the selectable button (second graphical indicator) is dismissed from the display at step 430 and the method returns to step 408 to monitor for further user interaction with the auto-corrected object. However, when no user selection of the selectable button (second graphical indicator) is detected at step 422 and it is determined at step 426 that the auto-correct action was not highly likely to be desired, the selectable button is reverted to the first graphical indicator at step 428 and the method returns to step 414 to monitor for further user interaction with the first graphical indicator.

Otherwise, when user selection of the selectable button is detected at step 424, the method proceeds to step 432, where the context menu is displayed. Again, the context menu should be displayed in close proximity to the object. In an exemplary embodiment, the context menu comprises a pull-down or pop-up menu. Other types of menus and other appropriate user interfaces will be apparent to those of ordinary skill in the art. Display of the context menu may be instantaneous (from the user's perspective) or may be performed using an animated process. The context menu should include one or more interactive commands that are relevant to the particular auto-correct action that has been performed. Typically, the commands of the context menu will enable the user to undo or modify the auto-correct action or to customize the action for future applications. At step 434 it is determined whether user selection of a command from the context menu is detected. If user selection of a command from the context menu is detected, the action corresponding to the selected command is performed at step 436. After the action corresponding to a selected command is performed at step 436, or if no user selection of a command from the context menu is detected at step 434, the method returns to step 426.

Again, at step 426 a determination is made as to whether the auto-correct action was highly likely to be desired by the user. If the auto-correct action was highly likely to be desired by the user, the selectable button (second graphical indicator) is dismissed from the display at step 430 and the method returns to step 408 to monitor for further user interaction with the auto-corrected object. However, if it is determined at step 426 that the auto-correct action was not highly likely to be desired, the selectable button is reverted to the first graphical indicator at step 428 and the method returns to step 414 to monitor for further user interaction with the first graphical indicator. The method 400 is shown and described as being a continuous loop. As mentioned, processing of the continuous loop may be terminated when it is determined that the auto-corrected object has been deleted from memory.

Figure 5:
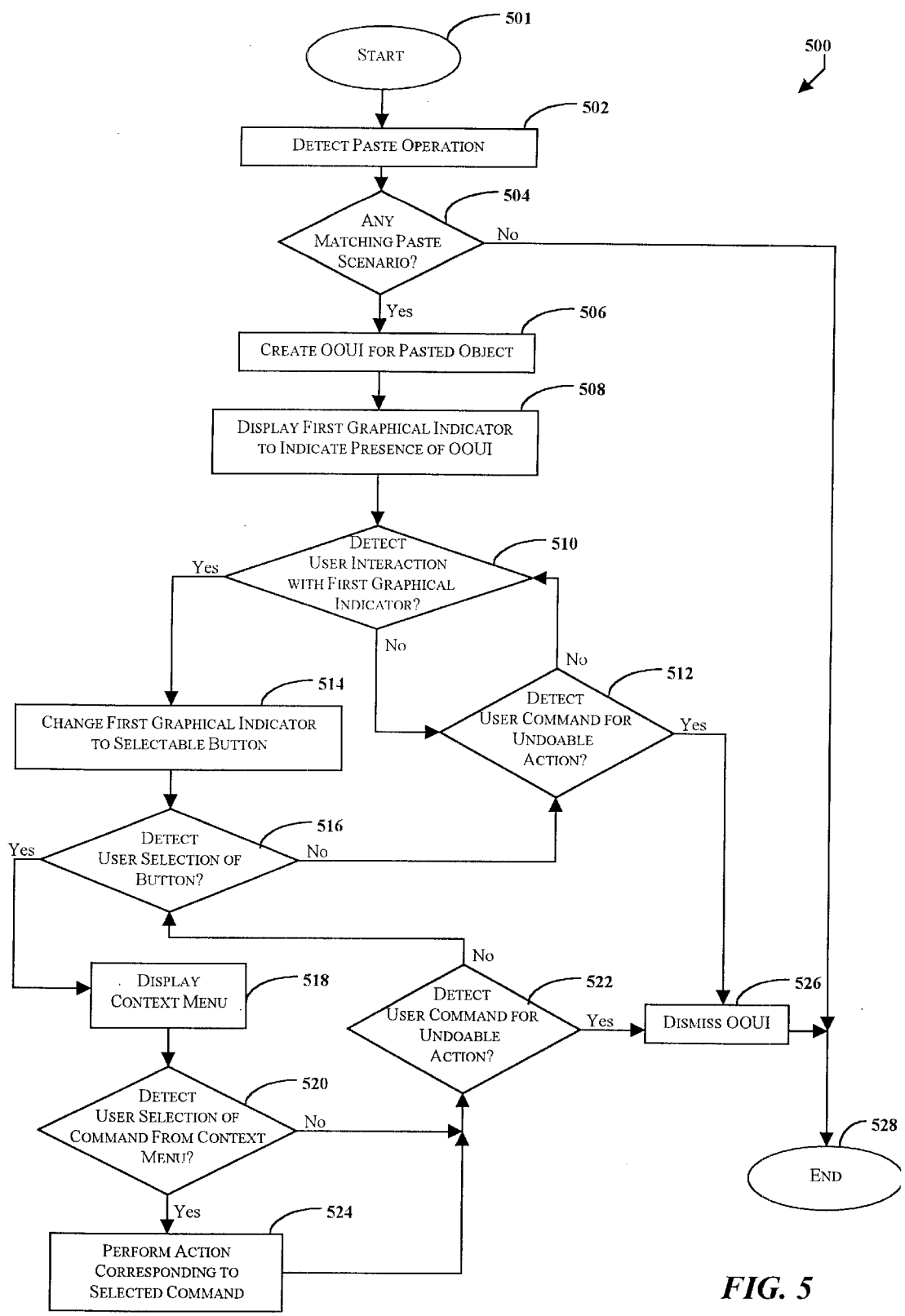
FIG. 5 is a flow chart that illustrates the general operation of an exemplary embodiment of the present invention in connection with a paste operation.

FIG. 5 is a flow chart illustrating an exemplary method 500 for creating, displaying and managing an OOUI in connection with a user-initiated action, such as a paste operation. The exemplary method 500 begins at starting block 501 where an application program module is being executed by a computer. From starting block 501, the method proceeds to step 502, where a paste operation is detected. Next, the method moves to step 504, where it is determined if a matching paste scenario exists. Several scenarios may exist for positioning and formatting an objected that is pasted within an application program module. For example, the pasted object may include text that will require the choice of a font, a size, a color, etc. The pasted object may be anchored with other objects in the target document. Text in the target document may be wrapped around the pasted object. The pasted object may be appended to a list, requiring a decision regarding whether to continue the existing list format (numbering, bullets, etc.) or to start a new list. As shown in FIG. 2, the pasted object may comprise cells from a table that will require a choice of cell format, including color, dimensions, and positioning. In a typical situation, the application program module applies some type of default paste scenario to a pasted object. Thus, the determination of step 504 is made in order to determine whether there are one or more additional paste scenarios (besides the default scenario) for the pasted object.

If at step 504 it is determined that no matching paste scenario exists, the method ends at step 528. However, if a matching paste scenario does exist, the method proceeds to step 506, where an OOUI is created and associated with the pasted object. An exemplary process for creating an OOUI was described above with reference to FIG. 4 (step 404). After creation of the OOUI, a first graphical indicator is displayed at step 508 in order to indicate the presence of the OOUI. As discussed with reference to FIG. 1, the first graphical indicator may be a "lightweight" indicator that is intended to be unobtrusive to the user. The first graphical indicator is meant to merely alter the user that a context menu exists for modifying the properties of the pasted object. Next, at step 510 the user interactions with the program module are monitored to determine if the user interacts with the first graphical indicator. The user may interact with the first graphical indicator, for example, by placing a pointing cursor over the graphical indicator using a mouse or other pointing device. If it is determined that the user does not interact with the first graphical indicator, a determination is made in step 512 as to whether the user causes an undoable action to be performed by the application module or whether the contents of the clipboard are changed. If the user commands an undoable action or changes the clipboard contents without interacting with the first graphical indicator, it may be assumed that the user accepts the automatic formatting applied to the pasted object and the OOUI may be dismissed at step 526. As long as the user does not command an undoable action or change the clipboard contents while the first graphical indicator is displayed, the method returns from step 512 to step 510 to await the detection of user interaction with the first graphical indicator.

When user interaction with the first graphical indicator is detected at step 510, the method advances to step 514, where the first graphical indicator is changed to a second graphical indicator, such as a selectable button. The second graphical indicator is intended to provide additional information to the user regarding the auto-correct action and the OOUI. Then, at step 516 a determination is made as to whether the user selects the selectable button (second graphical indicator). If the user does not select the selectable button, the method returns to step 512 to determine whether the user causes the application program module to perform an undoable action or to change the contents of the clipboard. Again, if an undoable action is performed or the clipboard contents are changed without selection of the button, it may be assumed that the user accepts the automatic formatting applied to the pasted object and the OOUI may be dismissed at step 526. Otherwise, if no undoable action is performed and the clipboard contents are not changed, the method returns from step 512 to step 510 to await the detection of further user interaction with the first graphical indicator.

When it is determined at step 516 that the user has selected the selectable button (second graphical indicator), the context menu of the OOUI is displayed at step 518. The context menu should include one or more interactive commands that are relevant to the particular paste operation that has been performed. Typically, the commands of the context menu will enable the user to undo or modify the auto-format actions that may have been performed in response to the paste operation. At step 520 it is determined whether user selection of a command from the context menu is detected. If user selection of a command from the context menu is detected, the action corresponding to the selected command is performed at step 524. After the action corresponding to a selected command is performed at step 524, or if no user selection of a command is detected at step 520, the method moves to step 522 to determine whether the user causes the application program module to perform an undoable action or to change the contents of the clipboard. Again, if an undoable action is performed or the clipboard contents are changed after or without selection of the button, it may be assumed that the user accepts the formatting applied to the pasted object and the OOUI may be dismissed at step 526. Otherwise, if no undoable action is performed and the clipboard contents are not changed after or without selection of the button, the method returns from step 522 to step 516 to await the detection of further user interaction with the selectable button (second graphical indicator). After the OOUI is dismissed at step 526, the exemplary method 500 ends at step 528.

Although the present invention has been described in connection with various exemplary embodiments, those of ordinary skill in the art will understand that many modifications can be made thereto within the scope of the claims that follow. For example, it is contemplated the graphical indicator described herein may take other forms and include additional functionality. Accordingly, it is not intended that the scope of the invention in any way be limited by the above description, but instead be determined entirely by reference to the claims that follow.

We claim:

1. A method for presenting information and controls to a user in response to an automatic action performed by an application program, comprising:
   determining the location on the display device of the object that was subject to the automatic action by the application program;
   associating with the object an on-object user interface comprising a first graphical indicator, a second graphical indicator and a context menu;
   displaying the first graphical indicator on the display device in proximity to the location of the object, the first graphical indicator indicating that the automatic action was performed;
   in response to detecting user interaction with the first graphical indicator, changing the first graphical indicator to the second graphical indicator, the second graphical indicator indicating that the context menu is available; and
   in response to user interaction with the second graphical indicator, displaying the context menu on the display device in proximity to the object.

2. The method of claim 1, wherein the automatic action comprises an auto-correct or an auto-format action.

3. The method of claim 2, wherein the first graphical indicator comprises a small rectangle that is displayed underneath the object.

4. A computer-readable medium having stored thereon computer-executable instructions for performing the method of claim 2.

5. The method of claim 2, further comprising prior to displaying the first graphical indicator, detecting user interaction with the object.

6. A computer-readable medium having stored thereon computer-executable instructions for performing the method of claim 5.

7. The method of claim 1, wherein the automatic action comprises setting of a property of the object in response to a user-initiated action.

8. The method of claim 7, wherein the property relate to formatting or positioning of the object.

9. The method of claim 5, wherein the user initiated action comprises a paste operation or an insert operation.

10. A computer-readable medium having stored thereon computer-executable instructions for performing the method of claim 9.

11. The method of claim 1, wherein the context menu comprises one or more interactive controls for allowing the user to undo or modify the automatic action.

12. The method of claim 1, wherein the context menu comprises an interactive control for allowing the user to customize future applications of the automatic action.

13. The method of claim 1, wherein the first graphical indicator is animated so as to capture the attention of the user.

14. The method of claim 1, wherein the second graphical indicator comprises a selectable button.

15. The method of claim 14, wherein the context menu comprises a drop-down menu that is activated in response to selection of the selectable button.

16. A computer-readable medium having stored thereon computer-executable instructions for performing the method of claim 1.

17. A computer-readable medium having stored thereon a data structure representing an on-object user interface for presenting information and controls to a user in response to an automatic action performed by an application program, the data structure comprising:
   a first graphical indicator to be displayed on a display device in proximity to the object that was subject to the automatic action, the first graphical indicator for indicating that the automatic action was performed;
   a second graphical indicator to be displayed on the display device in place of the first graphical indicator in response to detecting user interaction with the first graphical indicator, the second graphical indicator indicating that a context menu is available; and
   the context menu to be displayed on the display device in proximity to the object in response to user interaction with the second graphical indicator, the context menu comprising one or more interactive controls for allowing the user to undo or modify the automatic action.

18. The computer-readable medium of claim 17, wherein the automatic action comprises an auto-correct or an auto-format action.

19. The computer-readable medium of claim 18, wherein the first graphical indicator comprises a small rectangle that is displayed underneath the object.

20. The computer-readable medium of claim 17, wherein the first graphical indicator is to be displayed on the display device upon detection of user interaction with the object.

21. The computer-readable medium of claim 17, wherein the automatic action comprises setting of a property in response to a user-initiated action.

22. The computer-readable medium of claim 21, wherein the property relates to formatting or positioning.

23. The computer-readable medium of claim 22, wherein the user initiated action comprises a paste operation or an insert operation.

24. The computer-readable medium of claim 17, wherein the context menu further comprises an interactive control for allowing the user to customize future applications of the auto correct action.

25. The computer-readable medium of claim 17, wherein the first graphical indicator is animated so as to capture the attention of the user.

26. The computer-readable medium of claim 17, wherein the second graphical indicator comprises a selectable button.

27. The computer-readable medium of claim 26, wherein the context menu comprises a drop-down menu that is activated in response to selection of the selectable button.

* * * * *

UNITED STATES PATENT AND TRADEMARK OFFICE
CERTIFICATE OF CORRECTION

PATENT NO. : 6,583,798 B1
DATED : June 24, 2003
INVENTOR(S) : Hoek et al.

It is certified that error appears in the above-identified patent and that said Letters Patent is hereby corrected as shown below:

Column 4,
Line 17, "typed as "teh."" should read -- typed as "the." --
Lines 27 and 28, "the word "teh"" should read -- the word "the" --
Line 66, "the word "teh,"" should read -- the word "the," --

Column 6,
Line 32, ""teh," it should" should read -- "the," it should --

Column 11,
Line 50, "objected that" should read -- object that --

Column 12,
Line 10, "merely alter" should read -- merely alert --

Signed and Sealed this

Thirtieth Day of December, 2003

JAMES E. ROGAN
*Director of the United States Patent and Trademark Office*